Figure 1:
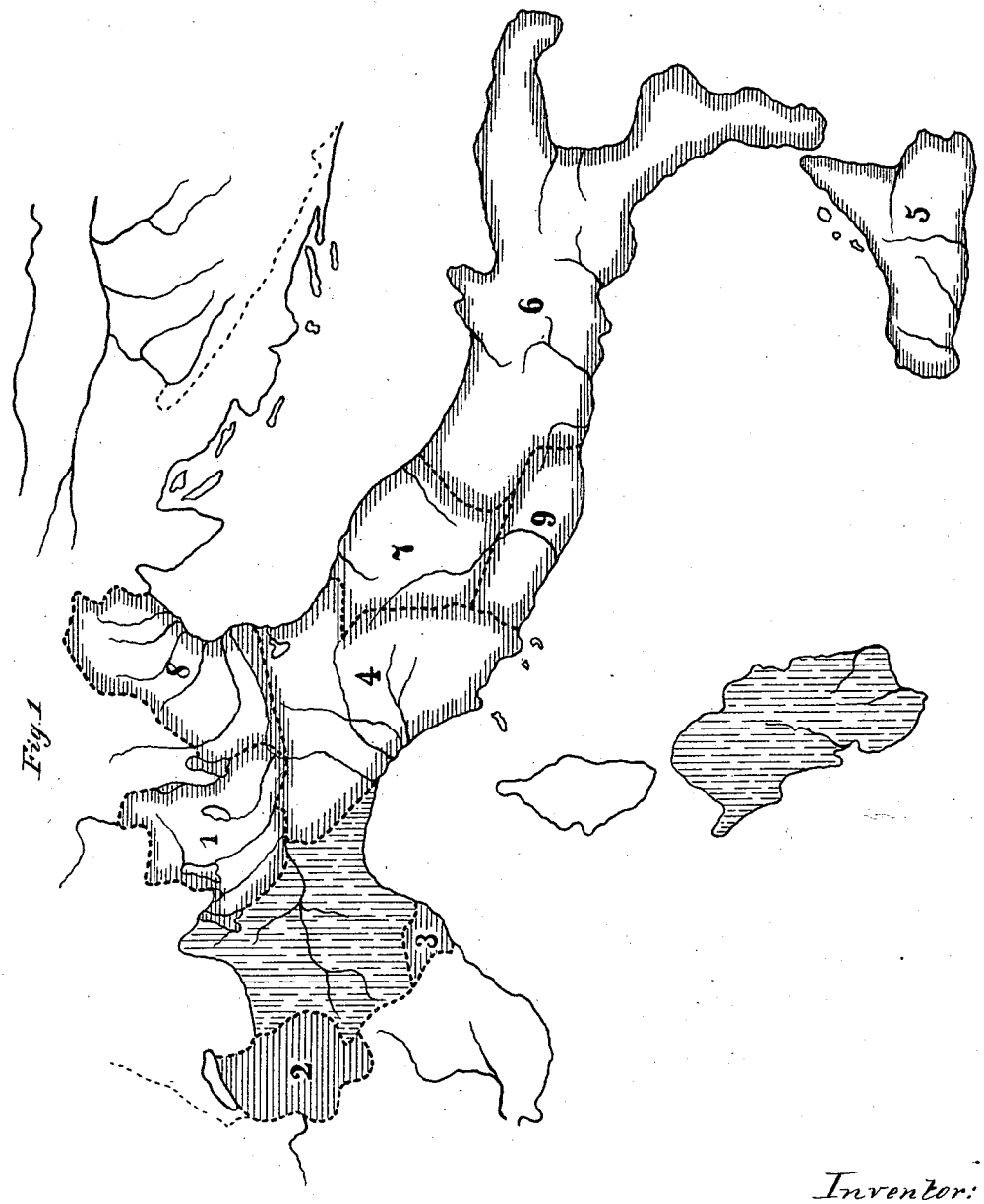

(No Model.) 2 Sheets—Sheet 1.
F. M. TAYLOR.
MAP.

No. 348,068. Patented Aug. 24, 1886.

Attest:
John Schuman.

Inventor:
Fred M. Taylor.
by his Atty
Thos. S. Sprague (No Model.) 2 Sheets—Sheet 2.
F. M. TAYLOR.
MAP.
No. 348,068. Patented Aug. 24, 1886.
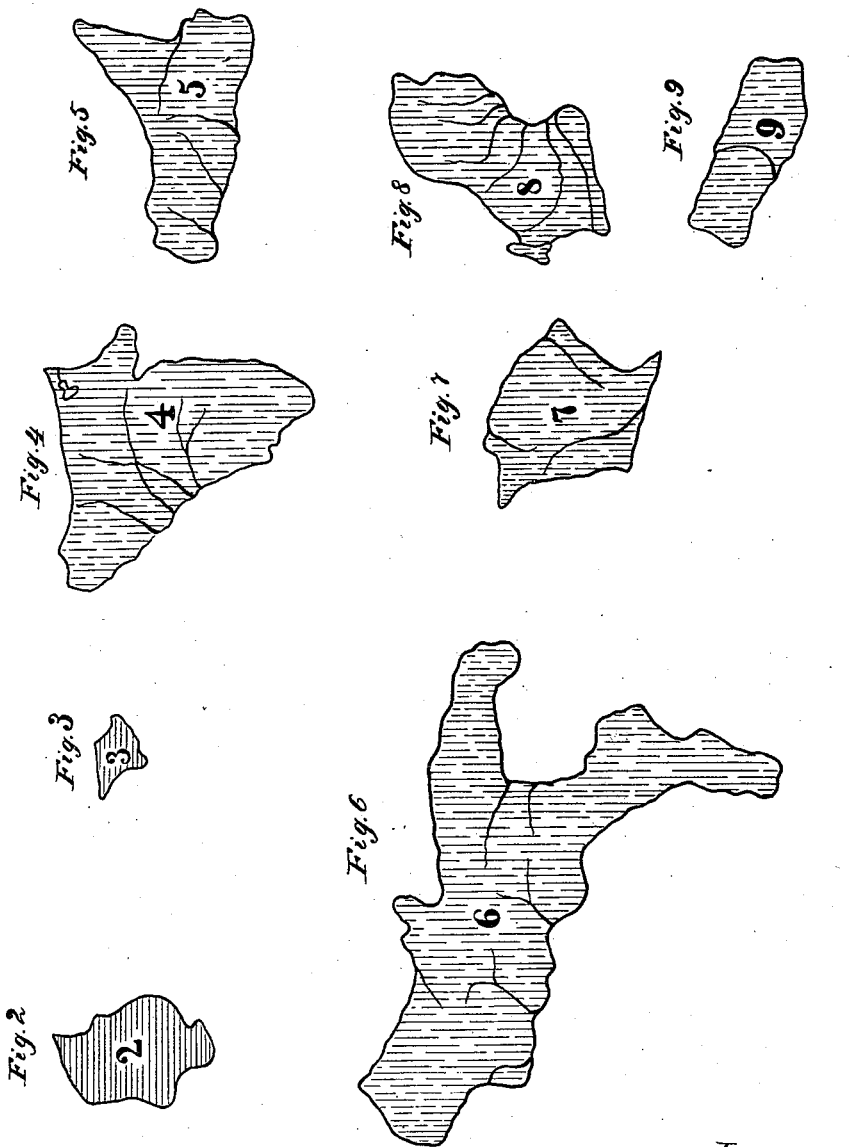
Attest:
John Schuman.
Inventor.
Fred. M. Taylor.
by his Att'y

UNITED STATES PATENT OFFICE.

FRED M. TAYLOR, OF ALBION, MICHIGAN.

MAP.

SPECIFICATION forming part of Letters Patent No. 348,068, dated August 24, 1886.

Application filed May 10, 1886. Serial No. 201,664. (No model.)

*To all whom it may concern:*

Be it known that I, FRED M. TAYLOR, of Albion, in the county of Calhoun and State of Michigan, have invented new and useful Improvements in Maps; and I do hereby declare that the following is a full, clear, and exact description thereof, reference being had to the accompanying drawings, which form a part of this specification.

This invention relates to a new and useful improvement in maps for educational purposes; and the invention consists in providing a map or chart with a series of such detached fractional maps or charts representing portions of the same territory as the original map or chart, and being exactly similar to the corresponding portions of said original map or chart in every particular, save color, that certain territorial changes—as, for instance, such as have taken place during a particular chapter in the political history of a nation or country—may be illustrated on the original map by overlaying the same, step by step, with the detached fractions representing such territorial changes, provided such changes are of the nature of territorial growth, and by following the converse way of removing the overlaid fractions, step by step, for territorial declines, a uniformity of color being used to identify the detached fractions with that part of the original map used in connection therewith.

A specific object of my invention is to furnish maps of this kind, particularly designed for the requirements of schools, to facilitate the study of such prominent epochs in ancient or contemporaneous history of great nations which are associated with great and complex territorial changes. For each epoch thus illustrated I use a uniform color for all the component territorial parts of the same political division, and preferably in connection with a suitable printed text or simple reference. My invention, however, is not limited to the specific application heretofore mentioned, but is equally applicable to illustrate all territorial changes of like nature in connection with other inciting causes or agencies.

For explaining my invention more in detail, I will choose as a theme the unification of modern Italy. To prepare a map to show the territorial changes in their proper sequence, as they have been brought about by a series of well-known political events, I proceed as follows: I prepare first a map of Italy, showing the political status of that country preceding the inauguration of the particular epoch to be illustrated. This map is represented in diagram in Figure 1, the shade lining being intended to represent color. Then I prepare a series of fractional maps, as shown in Figs. 2 to 9 of the drawings, one for each of the territories that subsequently became annexed. These fractions I color to correspond with the parent, which, in this case, is the Kingdom of Sardinia, number them in their proper sequence, and cut them out, so that they may be laid over the corresponding territory on the original map. In using this map for the study of that particular historical event the original map is overlaid with the fractional territories, the color and numbers enabling the student to follow the proper sequence, and also to identify the fractions as belonging to a certain political epoch. The original map may thus be used in connection with a series of other fractional maps which belong to different political epochs in the history of such country, a different color being used in every instance.

To hold the overlaid sections in their position on the map I preferably mount them on card-board or other suitable material and fasten them with tacks in place on the original map.

It is obvious that the geographical value of a map is in no way interfered with by my improvement. On the contrary, it will be seen that by means of the overlaid sections geographical changes can be taken account of.

The educational advantage of my improvement will be readily appreciated by the teacher, and the scope of the invention will be now easily understood from the above exemplification.

What I claim as my invention is—

1. In combination with an original map or chart, one or more fractional maps or charts adapted for overlaying a certain definite part or parts upon the original map or chart, and having a color identical with a certain part or parts of the original map or chart, or with one or more fractional maps or charts already superposed upon the original map or chart, all substantially as described.

2. In combination with an original map, one or more series of fractional maps adapted for overlaying certain definite parts upon the original map, and provided with a system of coloring identifying each series with a certain colored part of the original map, or with some fractional map already superposed upon the original map, substantially as specified.

FRED M. TAYLOR.

Witnesses:
EUGENE ROBERTSON,
JAS. H. SHELDON.